United States Patent [19]

Fujito et al.

[11] Patent Number: 4,741,420
[45] Date of Patent: May 3, 1988

[54] DAMPER FOR A DIAPHRAGM SPRING IN A CLUTCH

[75] Inventors: Nobutoshi Fujito, Neyagawa; Tamio Nagano, Hirakata; Syogo Ohga, Osaka; Hideo Kohno, Neyagawa, all of Japan

[73] Assignee: Kabushiki Kaisha Daikin Seisakusho, Osaka, Japan

[21] Appl. No.: 941,114

[22] Filed: Dec. 12, 1986

[30] Foreign Application Priority Data

Dec. 13, 1985 [JP] Japan .................................. 60-281702
Dec. 16, 1985 [JP] Japan ............................ 60-193322[U]

[51] Int. Cl.$^4$ ............................................. F16D 13/50
[52] U.S. Cl. .................................. 192/30 V; 192/70.27; 192/89 B
[58] Field of Search ................. 192/89 B, 70.27, 30 V

[56] References Cited

U.S. PATENT DOCUMENTS 4,241,819  12/1980  Babcock et al. ................. 192/70.27
4,448,294   5/1984  Brandenstein et al. .......... 192/30 V
4,633,990   1/1987  Fukutake et al. ................ 192/70.27

FOREIGN PATENT DOCUMENTS 1368245  9/1974  United Kingdom .............. 192/89 B Primary Examiner—Rodney H. Bonck
Assistant Examiner—David A. Testardi
Attorney, Agent, or Firm—Armstrong, Nikaido, Marmelstein & Kubovcik

[57] ABSTRACT

A damper is attached to a diaphragm spring in a clutch. The diaphragm spring includes a portion supported by a fulcrum which is rigidly connected to a flywheel, a portion connected to a pressure plate for pressing a clutch disc onto a flywheel, a portion adapted to connect to a release bearing, a plurality of radial slits extending from the inner periphery of the spring to the radially middle portion thereof and a plurality of radial fingers circumferentially divided by the slits. The damper includes a vibration damper member made from nonmetallic material and attached to said fingers. The damper member may have an annular shape extending along the diaphragm spring and be seated on surfaces of the fingers.

2 Claims, 3 Drawing Sheets

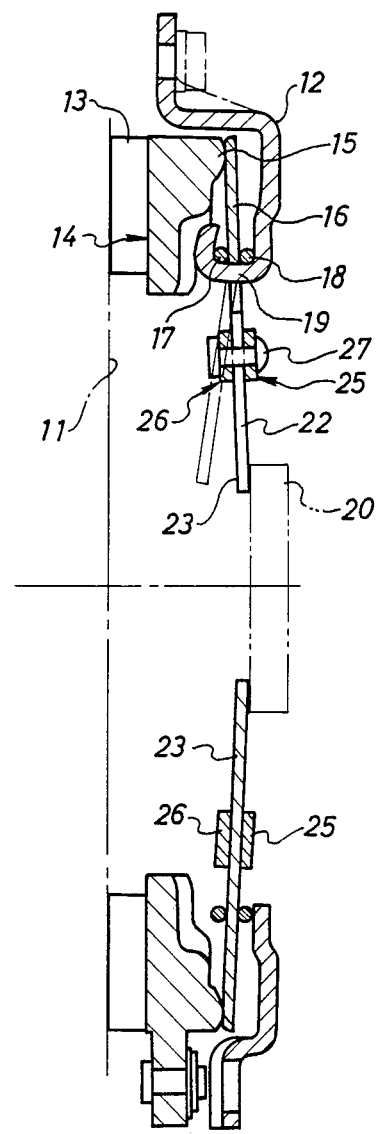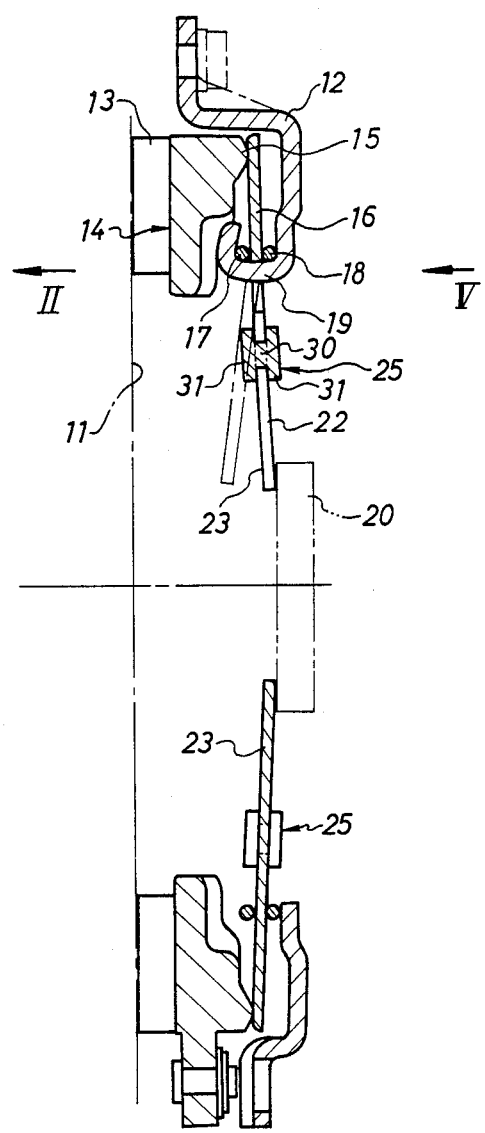

DAMPER FOR A DIAPHRAGM SPRING IN A CLUTCH

BACKGROUND OF THE INVENTION

The present invention relates to a damper for a diaphragm spring in a friction clutch used in automobiles and others.

Generally, as disclosed in U.S. patent application Ser. No. 703,473, now U.S. Pat. No. 4,633,990, a diaphragm spring of a clutch cover assembly is arranged in and supported by a clutch cover for forcing the pressure plate toward a friction facing of a clutch disc. The clutch cover is fixed to a flywheel of an engine. The diaphragm spring has radial fingers which extend from the inner priphery of the spring to a radially middle portion thereof. The outer ends of the fingers integrally continue to an radially outer annular portion of the spring, and the inner ends of the fingers are free ends.

In the above structure, when an axial vibration of the engine, to which the clutch is assembled, is transmitted through the clutch cover to the diaphragm spring, the fingers having the free ends may resonate.

This resonance causes a vibration of the pressure plate, which prevents smooth and uniform engaging operation of the clutch, and also, causes judder and noise.

Accordingly, it is an object of the invention to provide an improved structure, overcoming the above-noted problems.

SUMMARY OF THE INVENTION

The essence of the invention is to provide a damper member made from nonmetallic member, which is attached to radial fingers of a diaphragm spring.

According to the above structure, a vibration damper member attached to the fingers damps the vibration of the fingers, so that resonance of the fingers are prevented even when a vibration is transmitted to the fingers through a clutch cover.

Thus, a clutch engaging operation can be performed smoothly and uniformly, and judder as well as noise are prevented.

Other and further objects, features and advantages of the invention will appear more fully from the following description of the preferred embodiments of the invention.

BRIEF DESCRIPTION OF THE DRAWINGS

FIG. 1 is a sectional view of a clutch of an embodiment of the invention;

FIG. 4 is a sectional view of still another embodiment;

DETAILED DESCRIPTION OF THE PREFERRED EMBODIMENTS

Figure 2:
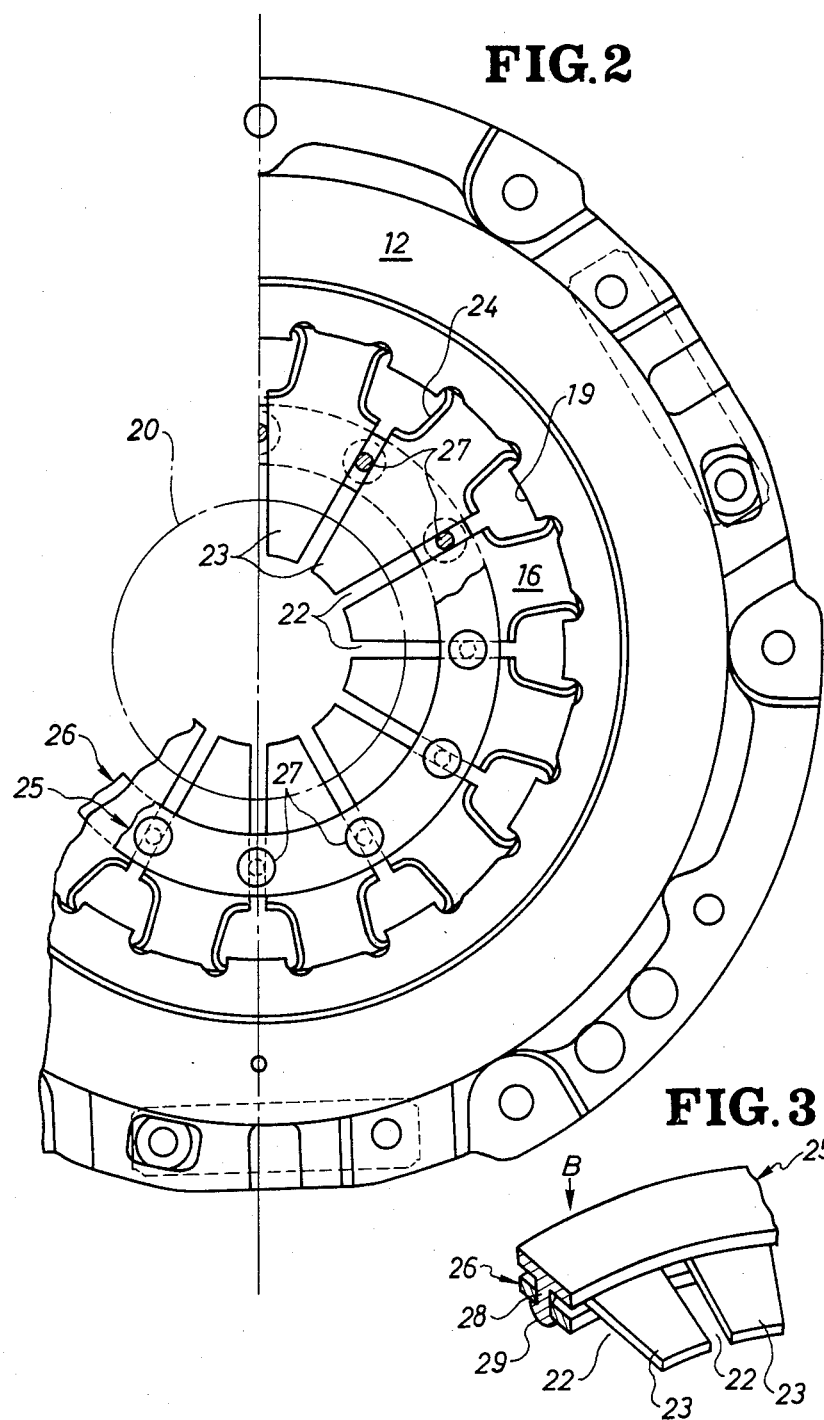
FIG. 2 is a plan view taken in the direction of arrow II in FIG. 1.

Referring to FIG. 1, an annular clutch cover 12 is fixed at its radially outer portion to a flywheel 11 of an engine (not shown). A clutch disc 13 arranged inside the clutch cover 12 has a central hub (not shown) connected to an output shaft (not shown). A friction facing of the disc 13 is adapted to the pressed onto the flywheel 11 by a pressure plate 14 which are arranged inside the clutch cover 12.

The pressure plate 14 is provided at its rear surface with projections 15, on which an outer peirpheral portion of a diaphragm spring 16 is seated. A pair of wire rings 17 and 18 are disposed on opposite surfaces of the radially outer or middle portion of the spring 16. The wire rings 17 and 18 form fulcrum means for the diaphragm spring 16, and are rigidly supported by bent tabs integrally formed at the inner periphery of the clutch cover 12. A release bearing 20 is arranged axially outside, (i.e., at a side opposite to the flwheel 12) the inner peripheral portion of the diaphragm spring 16. The release bearing 20 is axially movably arranged around the output shaft, and is connected to a clutch pedal (not shown) through link mechanism (not shown).

Referring to FIG. 2, the diaphragm spring 16 is provided with circumferentially spaced radial slits 22 or slots which extend from the inner periphery of the spring 16 to the radially middle portions thereof, so that only the radially outer portion of the spring 16 continuously and annularly extends and the radially inner and middle portions are circumferentially divided into a plurality of fingers 23. The radially outer ends of the slits 22 are circumferentially enlarged to form nearly rectangular or trapezoid openings 24 having round corners. Tabs 19 for holding the wire rings 17 and 18 extend from the cover 12 through the openings 24 toward the pressure plate 14, and, as shown in FIG. 1, are bent radially outwardly at it projected ends to hold the wire ring 17.

In FIG. 2, fingers 23 have radially elongated belt-like shapes, respectively. The radially outer ends of the fingers 23 integrally continue to the continuously annular outer portion of the spring 16, and the radially inner ends of the fingers 23 form free ends adapted to contact release bearing 20.

A vibration damper member 25 is associated to the fingers 23. The damper member 25 is formed by an annular member made from nonmetallic material such as rubber or synthetic resin having good vibration damping ability. The member 25 is seated on the surfaces of the radially intermediate portions of the fingers 23. The annular member 25 may be formed by some arcuate pieces.

An annular damper member 26 is seated on the opposite surfaces of the fingers 23. The member 26 is made from the same material as the member 25, and are connected together by a plurality of rivets 27 extending through the slits 22.

An operation is as follows. In the clutch engaged condition, the diaphragm spring 16 supported by the wire rings 17 and 18, i.e., the fulcrum means, elastically forces the pressure plate 14 toward the flywheel 11 to press the clutch disc 13 onto the flywheel 11. When the clutch pedal is stepped on, the release bearing 20 pushes the inner peripheral portion of the diaphragm spring 16 toward the flywheel 11 to a position illustrated by a phantom line in FIG. 1. Thus, the diaphragm spring 16 releases the pressing force against the pressure plate 14, so that the clutch disc 13 is released from the flywheel 11 and the pressure plate 14. When the stepped clutch pedal is gradually released, the diaphragm spring 16 gradually forces the pressure plate 14 to engage the clutch.

In the above operation, an axial vibration of the engine is transmitted from the flywheel 11 though the clutch cover 12 to the diaphragm spring 16. However, the vibration of the fingers 23 is damped by the damper members 25 and 26, so that the large vibration and resonance of the fingers 23 are prevented. Therefore, the vibration of the parts connected to the diaphragm spring 16, such as the pressure plate 14, the clutch cover 12 and release bearing 20, is effectively restrained, and thus, the clutch can be operated smoothly and uniformly without judder and noise.

According to the invetion, as described hereinbefore, since the resonance and large vibration of the diaphragm spring 16 can be prevented by the damper member 25 attached to the finger 23, the clutch can be operated smoothly without the judder and noise.

The present invention may be modified as follows.

Figure 3:
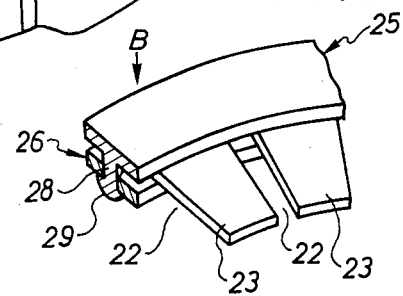
FIG. 3 is a perspective view of another embodiment of the invention with certain parts cut away.

In FIG. 3, circumferentially spaced projections 28 is used for connecting the members 25 and 26 together instead of the rivets 27 in FIG. 1. The projections 28 are formed integrally with the member 25, which is made from the synthetic resin. The projection 28 are provided at the ends with flange-like heads 29, of which end surfaces are formed into nearly conical or hemispherical shape. A stem part of each projection 28 is fitted into the slit 22 and an aperture of the damper member 26. The head 29 is engaged with the surface opposite to the finger 23 of the damper member 26.

According to this structure, in the assembling operation, the members 25 and 26 can be facilely attached to the fingers 23 only by pushing the member 25 is an axial direction indicated by an arrow B, after positioning the members 25 and 26 and the fingers 23 in predetermined relationship.

Instead of the member 26 in FIGS. 1, 2 and 3, a plurality of damper pieces, each of which engaged with the rivet 27 or projection 28, may be employed. Metallic members such as washers may be used instead of the damper member 26 or pieces.

In an embodiment in FIG. 4, a plurality of small damper members 25 are fitted in radially intermediate portions of all or some of the slits 22, respectively. Each damper member 25 includes a stem part 30 and radial flanges 31 at both ends thereof. The stem part 30 is fitted into the slit 22, and the flanges 31 at opposite ends are seated on the surfaces of the fingers 23. The fingers 23 are provided at the side edges with arcuate recesses 32 into which the stem parts 30 are fitted.

Figure 5:
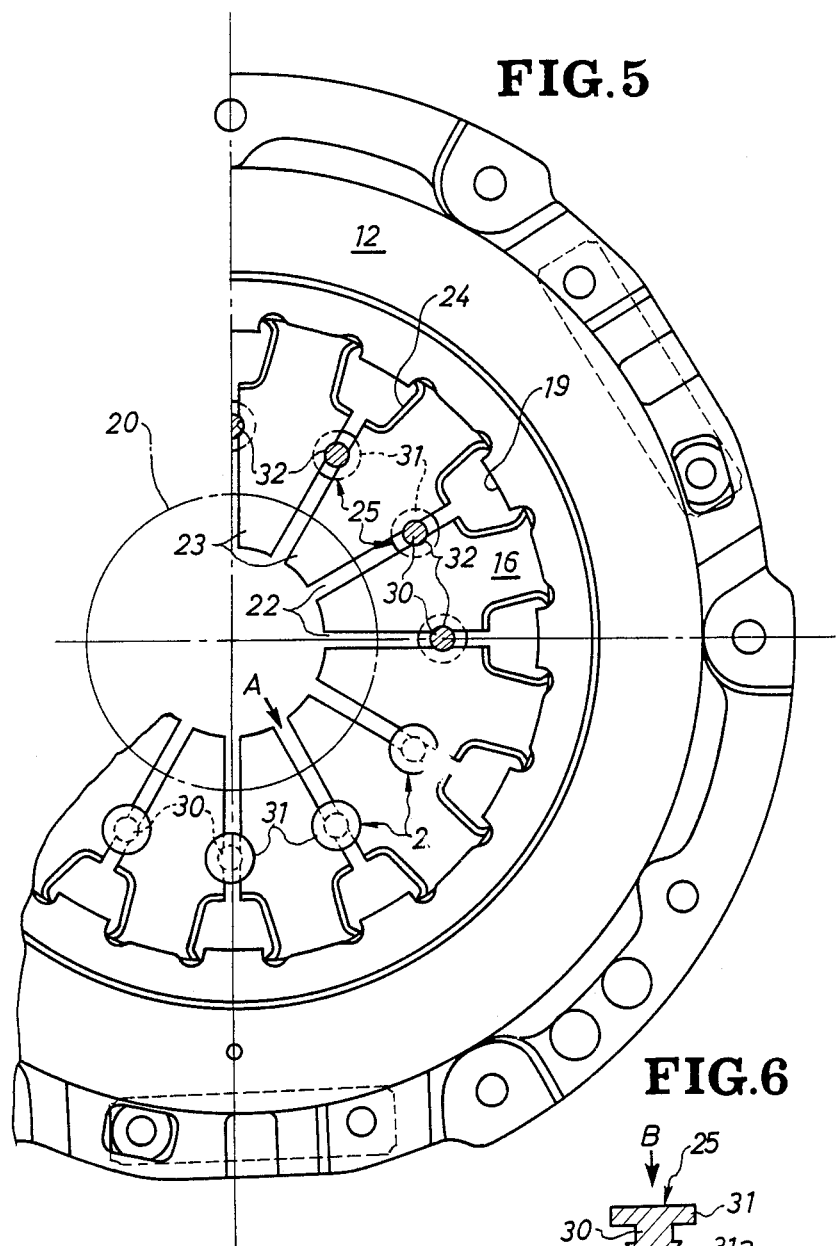
FIG. 5 is a plan view taken in the direction of arrow V in FIG. 4.

In the assembling operation, each damper member 25 is pushed radially outwardly though the radially inner end of the slit 22 to the recesses 32, as indicated by an arrow A in FIG. 5, while elastically deforming the stem part 30.

Figure 6:
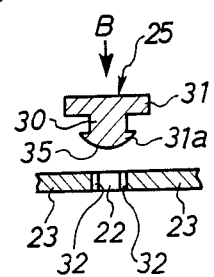
FIG. 6 is a sectional view of still another embodiment of the invention with certain parts cut away.

The member 25 in FIGS. 4 and 5 may be modified as follows. In FIG. 6, one of the flange 31a or each member 25 has a relatively small diameter and has an end surface of nearly conical or hemispherical shape. The member 25 can facilely be attached at the predetermined position by axially pushing it, as indicated by an arrow B, into the recesses 32 with the flange 31a ahead.

Although the invention has been described in its preferred form with a certain degree of particularity, it is understood that the structure of the preferred form may be changed in the details of construction, and that the combination and arrangement of parts may be modified to without departing from the spirit and scope of the invention as hereinafter claimed.

What is claimed is:

1. A damper for a diaphragm spring in a clutch, said diaphragm spring including a portion supported by a fulcrum rigidly connected to a flywheel, a portion connected to a pressure plate for pressing a clutch disc onto the flywheel, a portion for contacting a release bearing, a plurality of radial slits extending from the inner periphery of said spring to the radially middle portion thereof and a plurality of radial fingers circumferentially divided by said slits; said damper including a pair of annular damper members made from non-metallic material and extending along opposite sides of said diaphragm spring and connected together by connecting means integrally formed on one of said annular damper members and extending through said slits and through aligned holes in the other of said annular damper members, the ends of said connecting means extending through and beyond said other of said annular damper members fixing said annular damper members to said fingers.

2. A damper for a diaphragm spring of claim 1 wherein said fingers are provided at side edges thereof with said slits into which said connecting means are fitted.

* * * * *